United States Patent [19]

Coller

[11] Patent Number: 4,512,598
[45] Date of Patent: Apr. 23, 1985

[54] RELEASABLE LATCH BRACKET MEANS FOR A VEHICLE SUNROOF

[75] Inventor: John H. Coller, La Puente, Calif.

[73] Assignee: D. G. Shelter Products Company, City of Industry, Calif.

[21] Appl. No.: 199,358

[22] Filed: Oct. 21, 1980

[51] Int. Cl.³ .............................................. E05C 17/32
[52] U.S. Cl. ............................. 292/263; 292/DIG. 53
[58] Field of Search ................ 292/263, 278, DIG. 53

[56] References Cited

U.S. PATENT DOCUMENTS

| | | | |
|---|---|---|---|
| 2,676,828 | 4/1954 | Mallory | 292/263 |
| 3,974,753 | 8/1976 | Blongren et al. | 296/137 R |
| 4,005,901 | 2/1977 | Lutke et al. | 296/137 B |
| 4,120,524 | 10/1978 | Buck, Jr. | 292/263 |
| 4,216,983 | 8/1980 | Hough et al. | 292/263 |
| 4,257,632 | 3/1981 | DeStepheno | 292/263 |

FOREIGN PATENT DOCUMENTS 618966  4/1961  Canada ............................... 292/263

Primary Examiner—Richard E. Moore
Attorney, Agent, or Firm—Poms, Smith, Lande & Rose

[57] ABSTRACT

A quickly releasable and attachable latch bracket for latch means provided in vehicle sunroof constructions adapted to be completely removed from a sunroof opening in a vehicle wall. In removal of a sunroof from the opening, the latching mechanism remains connected to latch brackets and the latch brackets are provided a construction for quick release thereof from the frame member defining the sunroof opening whereby the periphery of the opening is unobstructed by any sunroof hardware. A latch bracket means having a construction for engagement with cooperable slots and recesses on a frame member and releasable retainer pins carried on pivotally mounted release levers wherein the retainer pins are unstressed by sunroof loads. A method for quickly releasing such a latch bracket from a frame member in a sunroof construction.

11 Claims, 15 Drawing Figures

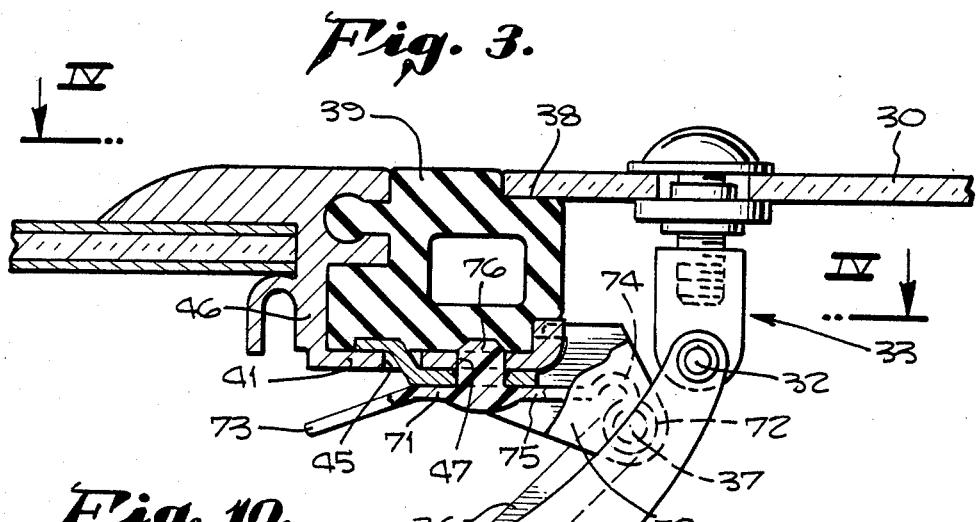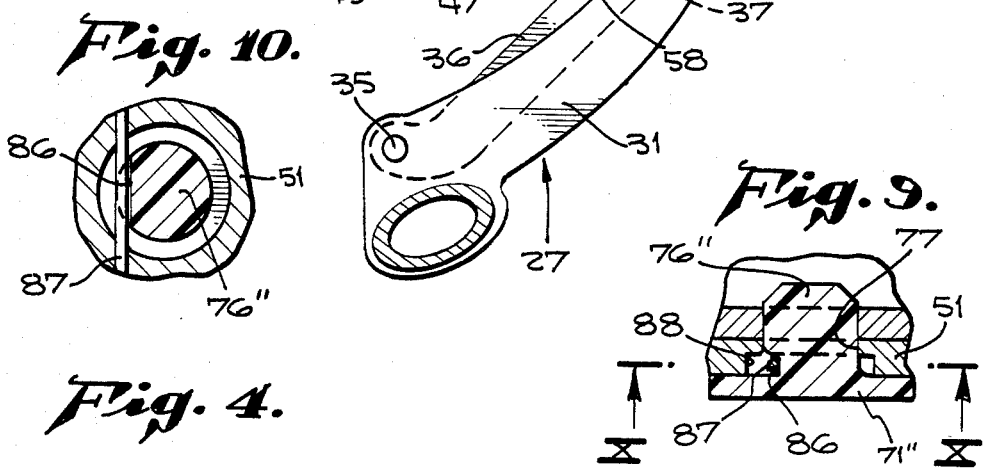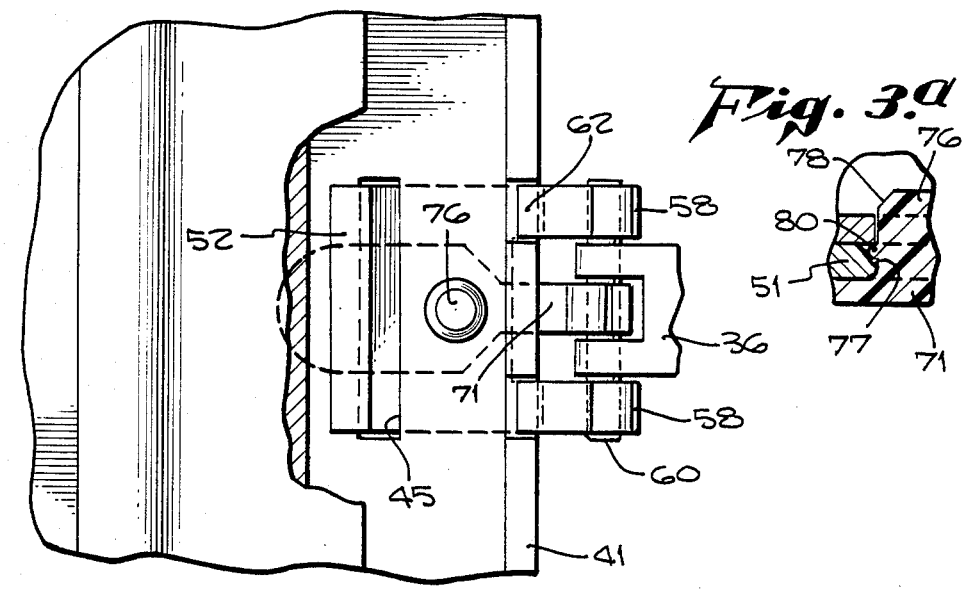

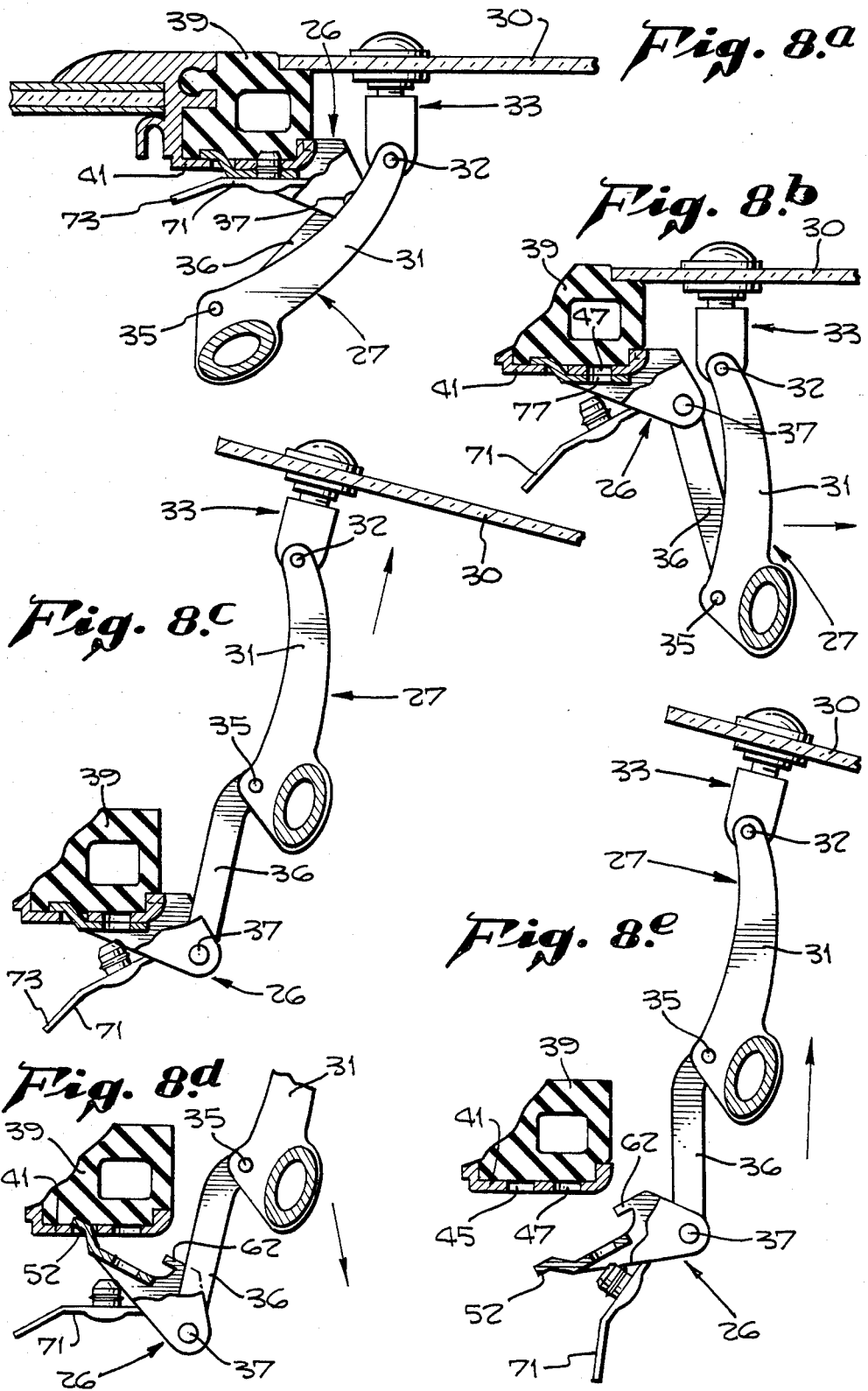

RELEASABLE LATCH BRACKET MEANS FOR A VEHICLE SUNROOF

BACKGROUND OF THE INVENTION

This invention generally relates to removable sunroofs for vehicles such as vans, recreational vehicles, passenger cars, and others. Usually, such sunroof constructions have provided a generally transversely arranged rectangular opening in the roof wall of the vehicle, the opening being defined by an extruded frame member having a particular cross section to seat a sealing gasket to facilitate airtight sealing of the sunroof in closed position. The sunroof is usually detachably hinged along the front transverse edge thereof to the frame member to permit the sunroof to lie within the contours of the vehicle roof wall when in closed position and to be lifted or pushed upwardly to an inclined rearwardly facing partially open position with respect to the opening and vehicle wall. Opening of the sunroof about its hinged connection to the frame member is usually controlled by one or more latch means, each latch means having a pivotal connection to the sunroof and also a pivotal connection to the frame member. In prior proposed roof constructions, the pivotal connection to the frame member was provided by one or more fixed non-removable brackets extending into the opening from the frame member, such brackets being secured to the inner periphery of the frame member.

It often becomes desirable to completely remove the sunroof so that the roof opening will be fully open and unobstructed by the sunroof closure member. Under such fully open sunroof removed conditions, prior proposed constructions left the latch mounting bracket on the frame, such bracket protruding into the opening and constituting a sharp hard projection which would be very hazardous to an occupant of the vehicle in the event of an accident or rapid manuevering of the vehicle to avoid an accident. Safety regulations for vehicles have become more strict and the presence of such bracket projections in a sunroof opening are objectionable and in some European countries are not permitted.

SUMMARY OF THE INVENTION

The present invention relates to a quickly releasable latch bracket means for removable sunroof constructions which avoids the unsafe conditions mentioned above. The invention particularly relates to a latch bracket quickly assembled or disassembled with the frame member of a vehicle wall opening to provide a framed opening which avoids inwardly projecting elements associated with a latching mechanism of the sunroof construction.

An important general object of the invention is to provide a quickly removable sunroof construction for a vehicle having a wall opening defined by a frame means and a sunroof panel normally removably hinged to the frame means at one side of the opening and having a latch means to secure the sunroof panel in closed position and to permit partial opening of the sunroof panel about its hinged connection wherein upon complete removal of the sunroof panel from the opening the latch means removes latch bracket means affording a connection of the latch means to the frame means and whereby the inner periphery of the frame means defining the opening is unobstructed by inwardly extending projections or by sunroof hardware.

It is therefore a primary object of this invention to provide a novel latch bracket means which is readily attachable to and detachable from a frame member.

An object of the invention is to provide a latch means for a removable sunroof wherein upon removal of the sunroof the periphery of a framed sunroof opening is void of any projections extending into the opening.

Another object of the invention is to provide a latch bracket means for a latch means for a sunroof construction which provides a pivotal connection to the latch means, a releasable connection to a frame member provided at a roof opening, and an interlock engagement between the latch bracket and the frame member whereby the latch bracket means serves to secure the latch means to a frame member and is readily disengageable therefrom during removal of the sunroof from the opening.

Another object of the invention is to provide a latch bracket means including a bracket body member having a bracket wall provided with an opening and interlock retainer means carried by the bracket body member for reception within said wall opening and for engagement with a frame member to releasably attach the bracket member to the frame member.

A further object of the invention is to provide a removable latch bracket means for a frame member in which the latch bracket means includes a first engagement means cooperable with the frame member and a second engagement means for registration and orientation engagement with the frame member.

A specific object of the invention is to provide such a removable latch bracket means for a frame member and latch means as described above in which one of the engagement means cooperable with the frame member includes a slot in the frame member and an offset portion provided at one end of a bracket wall.

Another specific object of the invention to provide a removable latch bracket means for a frame member as described above in which registration and positioning of the bracket means on the frame member includes tab means on the bracket means cooperable with corresponding notch means provided in the frame member whereby the bracket means is provided alignment and positioning in three dimensions.

A still further specific object of the invention is to provide a removable latch bracket means for a frame member as described above wherein interlock retainer detent means is provided on the latch bracket means, the interlock retainer means being connected to the latch bracket means for virtually free floating positioning for engagement with a bracket wall and a frame flange, the retainer means being unstressed by wind loads on the sunroof in open position or by clamping closure pressures of the latch means in sunroof closed position.

The invention contemplates various modifications of the interlock retainer detent means whereby the interlock means may be quickly and rapidly released to permit disengagement of the latch bracket means from the frame means.

A still further object of the invention is to provide a novel method of releasing the latch bracket means from the frame means.

Various other objects and advantages of this invention will be readily apparent from the following description of the drawings in which exemplary embodiments of the invention are shown.

IN THE DRAWINGS

FIG. 3 is an enlarged fragmentary sectional view of a releasable latch bracket means of this invention with the sunroof in closed position, the section being taken in a vertical plane bisecting the latch bracket means.

FIG. 3a is an enlarged fragmentary sectional view of the retainer interlock shown in FIG. 3.

FIG. 4 is a fragmentary top plan view of FIG. 3 with the sunroof, sealing gasket, and a portion of the peripheral frame member removed.

FIGS. 8a–8e, inclusive, schematically illustrates release of the latch bracket means from the peripheral frame member;

FIG. 8a being a sectional view similar to FIG. 3 and showing the sunroof and latch means in closed position;

FIG. 8b shows a first step in releasing the bracket means from the frame member;

FIG. 8c shows a second step in preparing to disengage the bracket means from the frame member;

FIG. 8d shows a third step in disengaging part of the bracket means from the frame member; and FIG. 8e shows the latch bracket means disengaged from the frame member and hanging from the latch means for the sunroof.

FIG. 9 is a fragmentary view of another modification of the retainer pin and bracket assembly.

FIG. 10 is a sectional view taken in the plane indicated by line X—X of FIG. 9.

Figure 1:
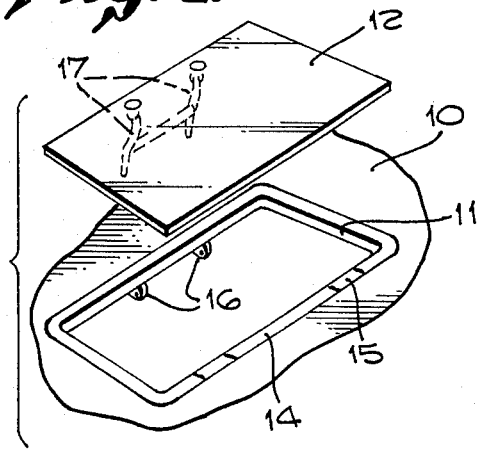
FIG. 1 is a schematic fragmentary exploded view illustrating a removed sunroof and sunroof vehicle opening of prior art construction.

To illustrate the problem that this invention has solved in FIG. 1 there is shown a prior art sunroof construction in which a vehicle roof 10 is provided with a roof opening 11 adapted to be closed by a sunroof 12 shown thereabove in a removed position. Opening 11 is provided by a peripheral frame means 14 provided with hinge means 15 along the front transverse edge and with a pair of spaced latch brackets 15 fixed as by rivets to the frame means along the rear transverse edge of opening 11. Sunroof 12 is provided with spaced toggle type latch means 17 which are connected to the sunroof and which are pivotally connected to latch brackets 16 and usually removable therefrom by removing pivot pins in the latch means. It will be understood that when sunroof 12 is unhinged and unpinned from riveted latch brackets 16 that latch brackets 16 protrude into the opening and constitute a rigid forwardly extending projection which may be of extremely hazardous to vehicle occupants in the event of an accident or unexpected maneuvering of the vehicle. It is thus desired, and in some European countries required, that such projections as 16 be eliminated.

Figure 2:
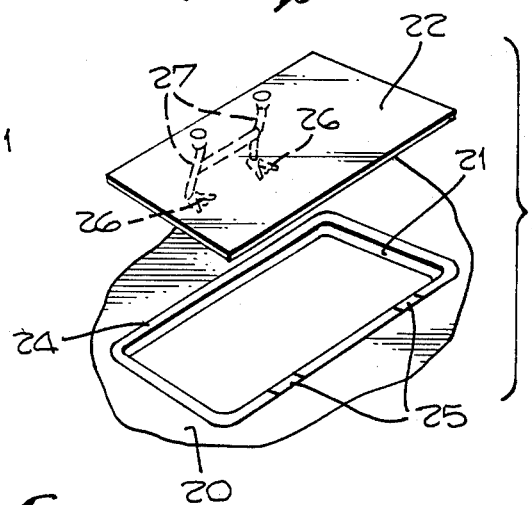
FIG. 2 is an exploded fragmentary perspective view of a sunroof and sunroof opening embodying the present invention and illustrating edges of the sunroof opening unobstructed by inwardly extending projections.

The present invention, which is shown in the remaining FIGS. 2–9, is generally illustrated in FIG. 2 wherein a roof wall 20 of a vehicle having an opening 21 is provided with a sunroof 22 removably hinged to the front transverse edge of opening 21 by hinge means 25. Latch brackets 26 of this invention are readily disengagable and removable from the peripheral frame means 24 and are pivotally associated with the sunroof latch means 27 so that when the sunroof 22 is removed the latch brackets 26 remain attached to the latch means 27. The peripheral frame means 24 is without any hazardous projections as a result of the sunroof construction. Hinge means 25 are readily removable amd may be of a type and construction as shown in U.S. Pat. No. 4,186,525 issued to a common assignee of this application.

In detail and first referring to FIG. 3, latch means 27 connected to a glass panel 30 forming sunroof 22 may be of the type, construction and operation as that shown in Pat. No. 4,120,524 also owned by a common assignee of this application. Latch means 27 comprises a latch member 31 pivotally connected at 32 to a mounting bolt assembly generally indicated at 33 for connecting the latch means 27 to the glass panel 30. Latch member 31 is pivotally connected at its other end at 35 to latch member 36 pivotally connected at 37 to bracket means 26 of this invention. It will be understood that latch means 27 may be any suitable means which in closed position holds the sunroof panel 30 in pressure relation at 38 against a peripheral relatively soft yieldable resilient gasket member 39 seated and secured to the upper surface 40 of flange 41 of frame means 24. In sunroof open position latch members 31 and 36 are extended with pivotal connection 35 moved past a toggle position to hold the sunroof panel 30 in upwardly inclined relation to the vehicle roof, the panel 30 being pivoted about its hinge means 25.

Figure 5:
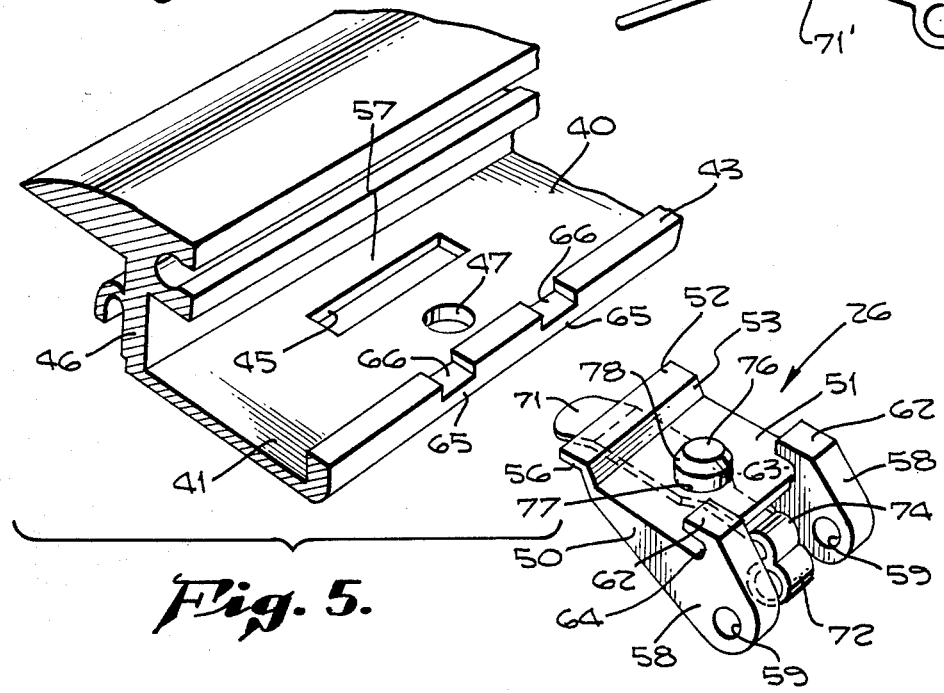
FIG. 5 is an exploded perspective view of a fragmentary portion of the peripheral frame member and the latch bracket means.

Frame means 24 may be made of any suitable metal extrusion having flange 40 extending peripherally around opening 21 and having a continuous inner peripheral edge 43. The rearward transverse portion of flange 40 FIG. 5 is provided with a longitudinally elongated generally rectangular slot 45 opposite each latch means 27 and spaced from vertically disposed web 46 of frame means 24. A port 47 is provided in flange 40 between each slot 45 and edge 43. Each slot 45 and port 47 serve as means to interengage or interlock with removable latch bracket means 26.

Bracket means 26 may comprise a bracket body member 50 having a bracket tranverse wall 51 having at one end a transverse lip portion 52 of selected length and thickness and offset as by an upwardly inclined portion 53 from wall 51 a sufficient distance so that offset portion 53 may extend into and through slot 45 to permit the bottom face 56 of lip portion 52 to seat on the margin 57 between slot 45 and web 46 in assembled position of bracket means 26 with the frame means 24.

Bracket wall 51 integrally merges with laterally spaced verticaly disposed lugs or ears 58 provided with aligned holes 59 for reception of a pivot pin 60. Lugs 58 provide space therebetween for reception of a bifurcated end of latch member 36 for relatively snug frictional pivotal mounting thereof on pin 60.

Each of the spaced lugs 58 may include top inwardly directed return portions or tabs 62 spaced above top surface 63 of wall 51 to define spaced recesses 64 adapted to receive reduced thickness sections 65 on flange 41 and in edge 43. Reduced sections 65 are formed by notches 66 cut in the top portion of edge 43. Notches 66 and return tabs 62 cooperate to laterally align bracket 50 with hole 47 and slot 45 during assembly of bracket means 26 with the frame means 40.

Figure 6:
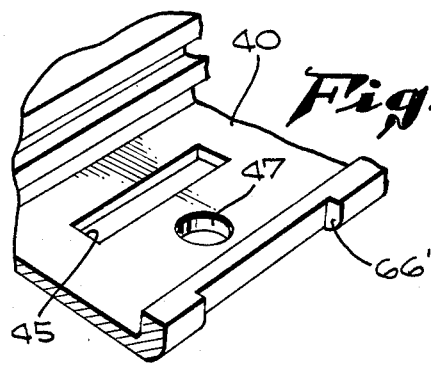
FIG. 6 is a fragmentary perspective view of a modification of the peripheral frame member with respect to positioning and orientation of the latch bracket means.

Bracket means 26 may also be aligned with hole 47 and slot 45 as shown in FIG. 6 by the provision of a vertically arranged notch 66' having vertical walls which may receive outer side wall surfaces of lugs 58. In this example the recesses 64 may be enlarged to accomodate the full thickness of edge 43.

Bracket means 26 also carries a release lever 71 having one end portion 72 formed in an eye for pivotal connection to pin 60 between the bifurcated ends of the latch member 36. Lever 71 includes an opposite end portion 73 downwardly bent from the main portion of lever 71 to facilitate engagement thereof by a finger when releasing the bracket means 26 from the frame means.

Lever 71 also comprises a semi-circular or arcuate portion 74 which commences at the top of the eye 72 and positions the plane of the main portion 75 of the lever above the axis of the eye 72. The main portion 75 carries an upwardly directed solid lock or retainer pin or stud 76 having a selected diameter to snugly fit hole 77 in bracket wall 51 and to project therethrough for a snug fit with port 47 in the flange 40. Retainer pin 76 may be provided with a top chamfer 78 to facilitate introduction of pin 76 into the hole 77 and port 47. As best seen in FIG. 3a, the bottom edge margins of hole 77 in bracket wall 51 may be provided with a slight radii to facilitate entry of the top chamfered portion 78 of pin 76. The top circumferential edge margin of hole 77 may be chamfered to provide a space and seat for an annular detent ring 80 provided on pin 76. Thus, when the latch bracket means 26 is assembled with the flange 40, release lever 71 is retained in its position relative to bracket wall 51 by the detent rib 80 and projection of the pin 76 upwardly and through port 47 retains the interlocked assembly of the bracket means and the frame member.

Assembly of the bracket means with the frame means includes the movement of the bracket body member 50, with pin 76 and lever 71 in release position upwardly and forwardly to engage lip portion 52 with slot 45. The body member may then be pivoted upwardly to engage the tabs 62 with the recesses 66 in edge 43 of the flange, the body member 50 being moved outwardly of the opening and across the frame 41 until lip 52 is seated on the margin 57 and the tabs 62 are fully engaged with the notches 66. In this position of the latch bracket means, the hole 77 in bracket wall 51 and port 47 in flange 40 are in alignment because of the registration of the notches 66 with the tabs 62 and abutment of the edges of reduced sections 65 with the bottom wall surface of the recesses 64 formed by tabs 62. The interengagement of the tabs 62 with the notches 66 provides alignment and registration of the bracket means 26 with the frame means.

The release lever 71 may then be pressed upwardly so that the pin 76 enters hole 77 in bracket wall 51 and upon pushing the lever 71 to its fully engaged position, the pin 76 will extend into the aligned port 47. During pivotal movement of release lever 71 about pin 60, the arcuate section 74 provides for resilient longitudinal displacement of the main portion 75 of the lever to facilitate alignment of the pin 76 with the hole 77. When the pin 76 is pushed into final position, the annular detent rib 80 engages the bevel on the upper surface of bracket wall 51 and serves to retain the release lever 71 in fully engaged position with bracket wall 51 and also the flange 40.

It should be noted that in assembled position and in sunroof closed position with the latch means shown as in FIG. 3, the downward compressive forces which press against the gasket and which also act through pin 60 of the pivotal connection of the bracket means to latch member 36 is resisted by the offset lip portion 52 and its engagement with the margin 57 of the frame member. When the sunroof is in open position and the latch means is extended, any downward pressure or wind loads imposed upon the sunroof are additionally taken by the engagement of the tabs 62 with the reduced sections 65. During such loading in both closed and open position of the sunroof, the retainer pin 76 is relatively free floating about the pivot pin 60 and pin 76 is not subjected to such loading stresses. The pin 76 and release lever 71 are virtually unstressed except for possible lateral shear loads placed on pin 76, such shear loads being minimized by the interengagement relationship of the bracket body with the flange of the frame means.

Release lever 71 and pin 76 may be molded of a springy material such as acetal sold under the trademark Celcon and may comprise a composition of nylon and fiberglass. Other resilient yieldable springy materials may be employed. The lever 71 may be made of a springy metal or other material to which a pin 76 may be attached by suitable well-known means. It is desirable for production purposes for the lever 71 and pin 76 to be integral and formed as by molding from a suitable resilient yieldable springy material.

Figure 7:
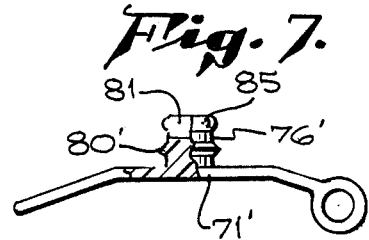
FIG. 7 is a side view of a modification of the release lever and retainer pin for use with the latch bracket means of this invention.

The detent means for the pin 76 which is described above includes an annular detent ring 80 engaged in a chamfered edge of hole 77 when assembled. The invention contemplates other pin and detent constructions to be employed in such an arrangement. For example, FIG. 7 illustrates a release lever 71' having a pin 76' provided with a detent ring 80'. The top of pin 76' may be provided with an enlarged bead 85 which is resiliently yieldable to snap through the port 47 in flange 40. To facilitate such deflection of the upper portion of pin 76', a diametrical slot 81 may be provided in pin 76', the slot extending longitudinally of the lever 71' so that as the pin 76' enters hole 77 and then port 47, the upper portion of the pin may yieldably compress to facilitate the full engagement of the pin 76' with both the bracket wall 51 and the flange 40. Displacement of pin 76' in the direction of the slot is restricted.

In another embodiment of the retainer pin construction as shown in FIGS. 9 and 10, a pin 76" is of the same solid cnstruction as pin 76 but without the annular detent ring 80. In this embodiment, a transverse chord-like recess is provided in one side of pin 76" at approximately the same location as the detent ring 80. Hole 77 of the bracket wall is provided with a straight piece 87 of a small diameter resilient yieldable wire such as piano wire having its ends embedded in or through the walls of the hole 77 and extending along the same cord chord as that of the recess 86 of pin 76". A rabbeted recess 88 is provided at the bottom of hole 77. Thus, when pin 76" is inserted into hole 77, the wire 87 is able to yield radially outwardly to permit passage of pin 76"; and when the recess 86 is positioned opposite the wire 87, wire 87 will snap into recess 86 and thus act to releasably retain the pin 76' in hole 77 and also in port 47 of the flange.

In the quick release operation provided by the latch bracket construction described above, FIGS. 8a–8e show progressive steps in releasing and disengaging bracket 26 from the frame means. As described above, the sunroof in closed and latched position is shown in FIG. 8a. To release latch bracket means 26, the handle of the latch means may be pulled or moved in a generally horizontal lateral direction to a position as shown in FIG. 8b to facilitate access to the lever 71. The downwardly bent end portion 73 of the lever is readily accessible to a finger to permit the lever 71 to be pulled downwardly about pivot pin 60 to disengage retainer pin 76 from both port 47 and hole 77. Such disengagement is facilitated by resilient lateral play provided by the arcuate lever portion 74. When the retainer pin 76 is clear, as shown in FIG. 8b and 8c, the latch means may be extended as by moving the sunroof towards open position as shown in FIG. 8c. This upward extension movement of the latch means may be less than to full sunroof open position since the latch members do not need to move to toggle locked position.

The expanded latch means may then be pulled downwardly and slightly inwardly as shown in FIG. 8d to first disengage tabs 62 with notches 66 by suitable inward movement of the latch handle and corresponding inward movement of the bracket means 26. When the bracket body member 50 and tabs 62 lie below the bottom surface of flange 40, further downward and inward movement will cause the lip portion 52 to pass downwardly through slot 45 and disengage the bracket means from the frame means. The sunroof may then be removed from the opening upon release in known manner of the hinge means at the other side of the sunroof.

It will be apparent that when the released latch bracket means 26 is carried at the end of the expanded latch means as shown in FIG. 8e, the periphery of the sunroof opening as defined by the inner peripheral edge 43 will be void of any projections which extend inwardly of the opening from the frame member. It will be understood, of course, that that hinge means at the other side of the opening are of a type which do not have projections into the opening.

It will be understood that various changes and modifications may be made in the releasable latch bracket means construction described above and all such changes and modifications coming within the spirit of this invention and coming within the scope of the appended claims are embraced thereby.

I claim:

1. In a latch means including a latch member for interconnecting a panel and a frame member defining an opening, the combination of:
   bracket means carried by one end of said latch member to be connected to said frame member,
   said bracket means including interlock means for cooperable releasable connection to said frame member to position and secure said one end of the latch member;
   said interlock means including sequentially operable sets of interlock elements;
   one of said sets of interlock elements including a lock pin on said bracket means,
   and a port on said frame member to receive said lock pin;
   the other of said sets of interlock elements including a lip portion on said bracket means,
   and an elongated slot opening on said frame member adapted to receive said lip portion.

2. A latch means as stated in claim 1 including means on said bracket means cooperable with means on said frame member for orientation of said bracket means with said frame member.

3. Means for quickly attaching and releasing a bracket member for a latch means on a sunroof with respect to a frame member defining a roof opening, comprising:
   a bracket body member providing a pivotal connection to a latch member of said latch means,
   said body member including a wall extending below said frame member and having an offset lip portion;
   said frame member having a slot releasably engageable by said lip portion;
   and a lock means carried by the body member and movable toward and away from said wall for releasable engagement with the frame member.

4. A means as stated in claim 3 wherein said lock means includes
   a pivoted member extending beneath said wall;
   a pin on said pivoted member spaced from said pivotal connection of the bracket body member and movable thereabout for engagement with means on said wall and frame member.

5. A means as stated in claim 3 wherein said body member includes
   means on said frame member and means on said body member for orientation and registration of said body member with said frame member.

6. A method of disengaging a latch bracket carried by a latch means having a link member from a supporting frame, said latch means being pivotally connected to a hinged closure member and pivotally connected to said latch bracket, including the steps of:
   moving said closure member and latch means from fully closed position to partially unlatched and open condition;
   releasing a lock pin carried by the bracket from the frame in such partially open condition;
   moving the latch means and closure member to a more fully open position to position the link of the latch means above the pivotal connection of the bracket;
   and downwardly moving the link of the latch mechanism and the closure at least partially towards closed position to disengage said bracket from said frame.

7. A method for disengaging a latch bracket from a supporting frame member in which a latch means having an operating handle is pivotally connected to a closure member and pivotally connected to said bracket, said latch bracket having interlock means with said bracket body member and with said frame member; including the steps of:
   moving said closure member and latch means to an unlatched closure member open condition by upwardly moving the handle about the bracket pivotal connection;
   releasing said interlock means;
   and moving the closure member towards closed position by downward movement of the handle to unseat and release said latch bracket from said frame member.

8. In a means as stated in claim 3 wherein said lock means includes
   an upstanding lock pin having a top split portion to facilitate entry into a hole in said bracket body member wall and into a port in said frame member, said pin and said bracket wall having detent means to releasably hold said pin in interlocking relation with said bracket wall, said upper portion of said pin having second detent means for engagement with said frame member whereby in interlocked relation of said bracket member with said frame member a dual safety releasable attachment is provided.

9. In a latch means including a latch member for interconnecting a panel with a frame member, the combination of:

bracket means carried by one end of said latch member, said bracket means including interlock means adapted for cooperable releasable connection to said frame member to position and secure said one end of the latch member; said interlock means including sequentially operable sets of interlock elements, said interlock elements being arranged transversely of the frame member;

one of said sets of interlock elements including a lock pin on said bracket means, and a port on said frame member to receive said lock pin;

said lock pin includes a recess along a chord thereof;

said bracket means includes a bracket wall having a hole alignable with said port, a resilient wire extending along a chord corresponding to said recess, and a recess in said wall at said hole to receive said wire during passing of the lock pin into the hole.

10. In a removable sunroof construction for a vehicle having a wall opening defined by a frame means, said wall opening having a virtually even, smooth inner peripheral edge surface, and a latch means lying in a planar zone normal to the plane of frame means normally secured at its ends to a sunroof panel and to said frame means, the combination of:

bracket means carried by the latch means;

means for releasably attaching the bracket means to the frame means in said planar zone to position and secure one end of the latch means; said releasable means including interlock means on said bracket means and cooperable means on said frame means said interlock means including a release lever member pivotally carried by said bracket means in said planar zone, and an upstanding lock pin on said release lever member engageable with means on said frame means.

11. A method of disengaging a latch bracket from a roof frame providing an opening closable by a roof panel carrying a latch means pivotally connected to said panel and having a link member pivotally connected to said bracket, said latch bracket being releasably attached to said frame by interlock means including a release lever pivotally connected to said bracket, the steps of:

moving said roof panel towards open position and simultaneously releasing said lever from said frame;

and moving said latch means downwardly and inwardly to release said bracket from said frame.

* * * * *